Figure 1:
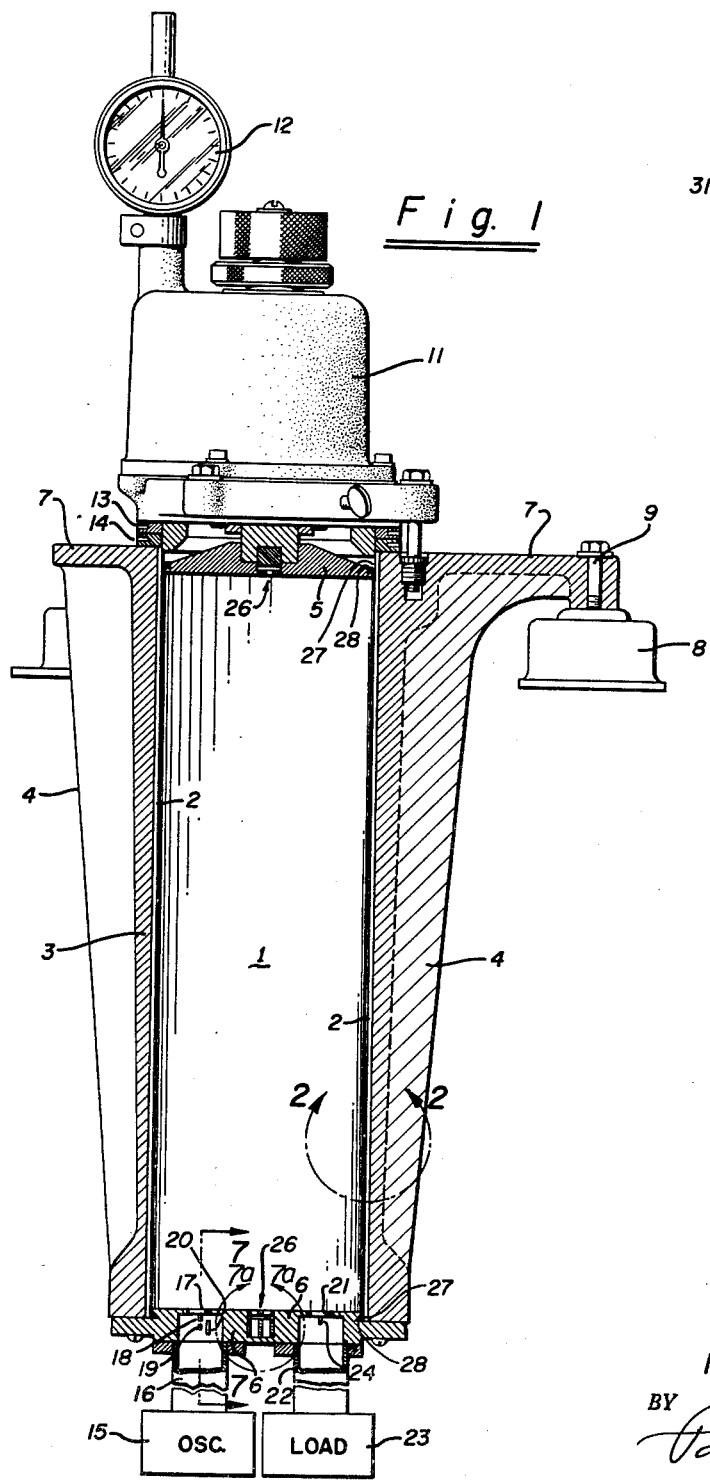

Nov. 7, 1961  M. W. ST. CLAIR  3,008,102
CAVITY RESONATOR METHODS AND APPARATUS
Filed Jan. 16, 1957  3 Sheets-Sheet 1

INVENTOR.
Maurice W. St. Clair
BY
Paul B. Hunter
Attorney

Portion of a Circular Electric Mode Chart

INVENTOR.
Maurice W. St. Clair

BY
Attorney

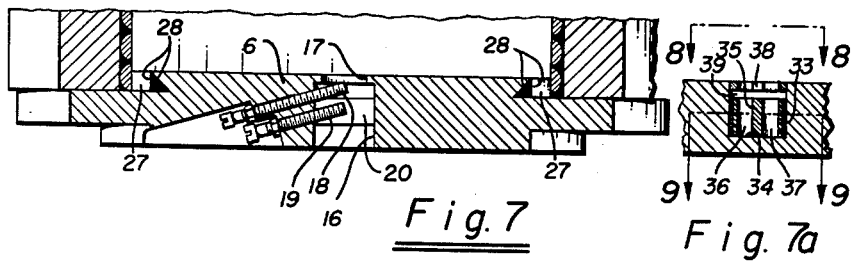
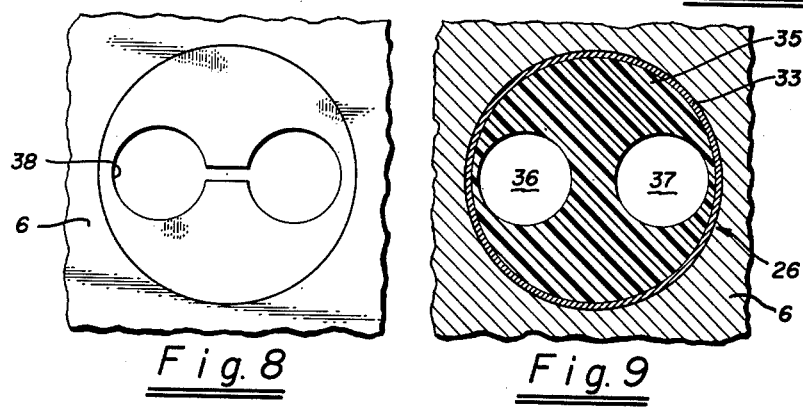
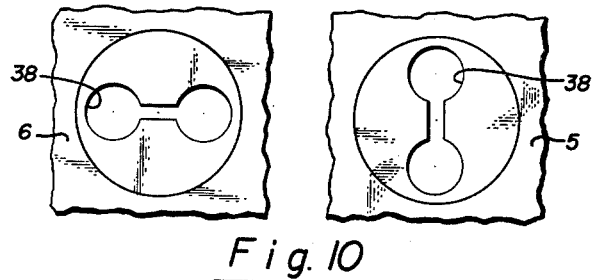
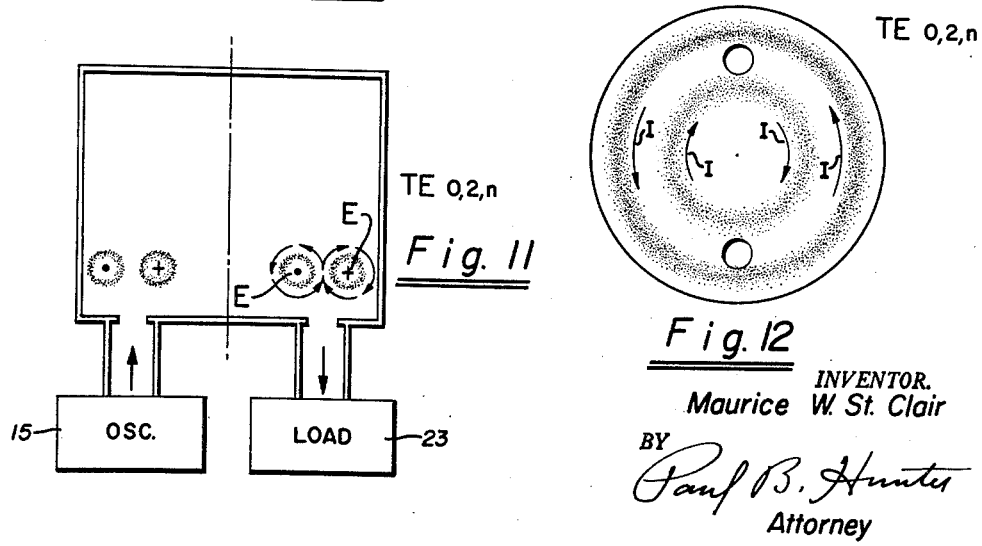

United States Patent Office 3,008,102
Patented Nov. 7, 1961

3,008,102
CAVITY RESONATOR METHODS
AND APPARATUS
Maurice W. St. Clair, Palo Alto, Calif., assignor to Varian Associates, San Carlos, Calif., a corporation of California
Filed Jan. 16, 1957, Ser. No. 634,498
8 Claims. (Cl. 333—33)

The present invention relates in general to cavity resonator methods and apparatus and more specifically to an extremely high Q tunable resonator useful, for example, as a stabilizing resonator for high frequency oscillators, as a highly selective microwave filter, and for other uses.

The present invention is an improvement relating to high frequency cavity resonators as taught in the previous copending application entitled, "High Frequency Tunable Cavity Apparatus," S.N. 480,207, filed January 6, 1955, inventors—Malcolm L. Stitch et al.

It is well-known that a cavity resonator may simultaneously support resonant fields in a great many modes. The total field configuration within the cavity resonator comprises the superposition of all of the excited electromagnetic fields of the oscillating modes. It is also well-known that some field configurations have less energy losses associated with them than other field configurations. The energy loss associated with a particular field configuration or mode is due to the $I^2R$ losses attendant circulating currents in the cavity resonator walls.

One certain family of field configurations known as the circular electric, or "smoke ring" family of modes or more precisely designated as the $TE_{0,m,n}$ family wherein $m$ and $n$ may have any integer values is known to possess less loss associated with its field than any other known family of field configurations. Within this circular electric family of high Q modes there is one sub family having a higher Q than the remaining modes. This high Q sub family of modes comprises the higher order $TE_{0,1,n}$ modes where $n$ can have any integer value greater than 4. If a cavity resonator can be made to oscillate in the higher order $TE_{0,1,n}$ modes exclusively, the cavity can be made to have an extremely high Q. The problem resides in being able to suppress the unwanted modes of oscillation over a wide range of frequencies for broad tuning range while not lowering the Q of the desired modes.

Heretofore, various mode suppression schemes have been utilized for suppressing unwanted transverse magnetic (TM) and transverse electric (TE) modes. In the copending application, referred to above, the unwanted TM family of modes, which are characterized by substantial longitudinal currents in the cavity side walls, were suppressed by the utilization of annular gaps between the resonator end conducting walls and side walls thereby preventing the flow of longitudinal currents therebetween. These gaps suppressed all the unwanted transverse magnetic modes, but there still remained a plurality of unsuppressed field configurations of the TE family which possessed considerably lower Q than the desired circular electric family of modes and interfered with continuous tuning of the cavity at points where they crossed the desired mode.

Due to these unsuppressed relative high loss transverse electric modes it was possible to obtain only a 60 megacycle frequency range wherein there were no interfering low Q modes within the cavity resonator when operating at X-band frequencies.

The present invention provides novel mode suppression and mode exciting techniques wherein the undesired transverse electric and transverse magnetic modes that previously remained unsuppressed may be suppressed such that the tuning range of the high Q cavity resonator may be greatly enhanced to an almost unlimited extent. For example, at X-band frequency range utilizing the novel features of the present invention it has been found that a cavity resonator can be made having a tuning range of 2,000 megacycles as compared to the previously obtainable 60 megacycle range.

An exemplary cavity resonator operating at X-band frequency will be described; however, the invention is not limited to such a frequency range and is equally applicable in general to cavity resonators operating at frequencies spread throughout the microwave range. Some of the features that will be described herein as they are applied to the novel cavity resonator are applicable in general to wave propagating structures and not limited exclusively to cavity resonator applications. It is not intended that the scope of the present invention should be limited to cavity resonators.

The principal object of the present invention is to provide a novel improved high Q cavity resonator having a wide tuning range and being useful as a tunable high Q resonant circuit, as a filter, as a means for stabilizing high frequency oscillators and the like.

Another feature of the present invention is the provision of a novel cavity resonator device wherein the side walls of the cavity resonator are composed of a conductor tightly wound in a helical configuration and embedded in a lossy material whereby unwanted modes of oscillation may be highly attenuated and prevented from being excited.

Another feature of the present invention is the provision of a novel wave energy attenuator disposed in the end walls of the cavity resonator for highly attentuating unwanted modes of oscillation within the cavity resonator.

Another feature of the present invention is the provision of a novel method for coupling wave energy to and from the $TE_{0,1,n}$ mode of a cavity resonator whereby the coupling means couples to the fields of the $TE_{0,1,n}$ mode without substantially coupling to the fields of the $TE_{0,2,n}$ mode.

Another feature of the present invention is the provision of a novel coupling means disposed in the end plates of the cavity resonator at a distance from the center of the end plates such that the fields of the $TE_{0,2,n}$ mode are substantially uncoupled from the coupling means.

Figure 2A:
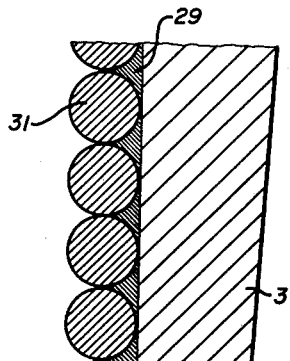
Figure 2B:
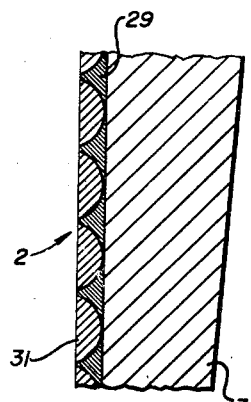
Figure 3:
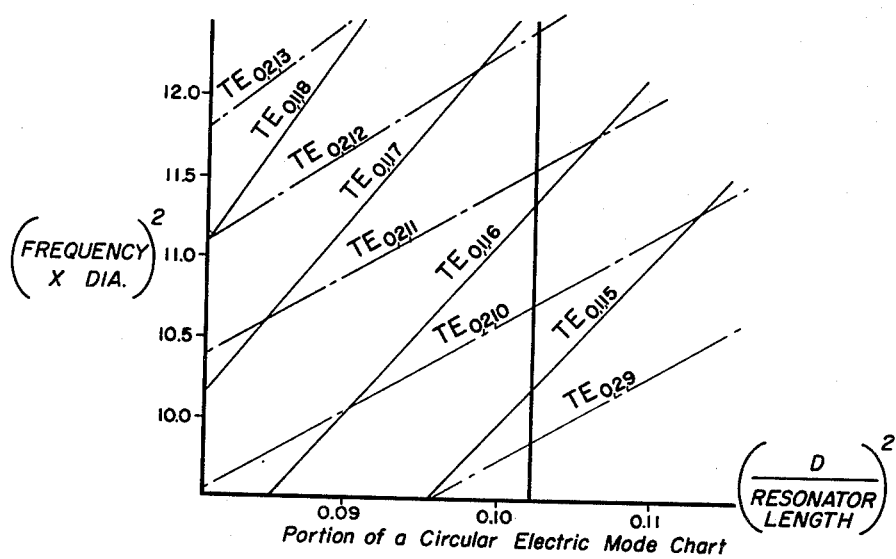
Figure 4:
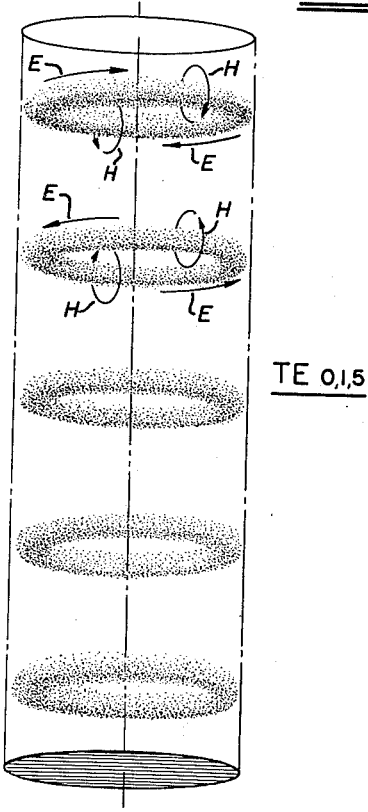
Figure 5:
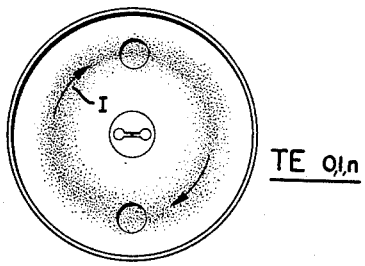
Figure 6:
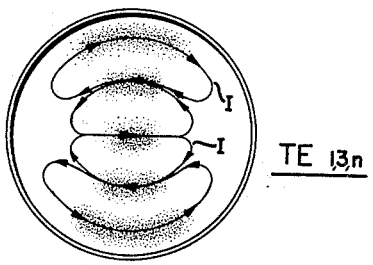

Other features of the present invention will become apparent on a perusal of the specification taken in connection with the accompanying drawings wherein, FIG. 1 is a side elevational view, partly in section showing the novel cavity resonator of the present invention, FIG. 2a is an enlarged fragmentary view of a portion of the structure of FIG. 1 delineated by line 2—2 of FIG. 1 and depicting the method of fabricating the side walls of the structure of FIG. 1, FIG. 2b is an enlarged fragmentary view of the structure of FIG. 1 delineated by line 2—2 of FIG. 1, FIG. 3 is a portion of a circular electric mode chart depicting the typical modes of operation within a limited frequency range of the structure of FIG. 1, FIG. 4 is a schematic drawing showing the $TE_{0,1,5}$ circular electric mode configuration, FIG. 5 is a plan view in schematic form of the current distribution of the $TE_{0,1,n}$ mode in the end plates of a circular cavity resonator, FIG. 6 is a diagrammatic plan view of an end plate of cavity resonator showing the $TE_{1,3,n}$ mode current distribution, FIG. 7 is an enlarged cross sectional view of a portion of the structure of FIG. 1 taken along line 7—7 in the direction of the arrows, FIG. 7a is an enlarged fragmentary view of a portion of the structure of FIG. 1 delineated by line 7a—7a of FIG. 1, FIG. 8 is an enlarged view of the portion of the structure of FIG. 7a taken along line 8—8 in the direction of the arrows, FIG. 9 is an enlarged view of the portion of the structure of FIG. 7a taken along line 9—9 in the direction of the arrows, FIG. 10 is a reduced view of the structure of FIG. 8 showing two of the devices of FIG. 8 disposed in right angle relation with respect to each other as found in the structure of FIG. 1, FIG. 11 is a diagrammatic view of the fields of the $TE_{0,2,n}$ mode in a cylindrical cavity resonator, and FIG. 12 is a diagrammatic view of the end wall of the cylindrical cavity resonator showing the current density distribution for the $TE_{0,2,n}$ mode.

Referring now to FIG. 1 a cavity resonator 1 is depicted having its side walls defined by a cylindrical conducting liner 2 which will be more fully described later in the specification. The liner 2 is carried within a hollow bell-shaped cavity housing 3 having longitudinal ribs 4 thereon which is made of magnesium so as to be lightweight and rigid. One end of the cavity resonator is defined by a movable transverse circular plunger 5 which is translatable along the longitudinal axis of the cavity resonator 1. The other end of the cavity resonator is defined by a rigid transverse circular end wall 6 fixedly secured to the cavity housing 3. The cavity housing 3 is provided with a flange 7 at the wide end thereof which is suitably bored around its periphery and anchored in shock resistant mounts 8 via hold down cap screws 9. The shock resistant mounting of the cavity resonator 1 prevents unwanted shock and vibration from being transmitted from the environment to the cavity resonator and thereby reduces unwanted microphonic frequency perturbation in operation of the resonator.

A tuner assembly is mounted over the cavity housing 3 at the wide end thereof and serves to provide means for translating the tuning plunger 5 within the cavity resonator 1 to thereby tune the frequency of the resonator. An indicator 12 is provided for indicating the position of the plunger 5 within the cavity resonator and may be calibrated in terms of frequency or plunger position, as desired. Two tapered rings 13 and 14 are provided between the tuner assembly 11 and the flanged portion 7 of the bell-shaped cavity housing 3 for providing alignment of the tuning plunger 5 within the cavity resonator 1. The tuning assembly 11, tapered rings 13 and 14 and frequency indicator 12 are more fully described in the aforementioned copending application.

Since one of the primary uses of a cavity resonator as shown in FIG. 1 comprises its use as a stabilizing resonator for stabilizing the oscillating frequency of a high frequency oscillator, the cavity resonator 1 is shown as it would be utilized for this application. Accordingly a high frequency oscillator 15 such as, for example, a reflex klystron is shown coupled to the cavity resonator 1 via a short length of rectangular waveguide 16 which includes a portion of its length milled out of the cavity end plate 6. The rectangular waveguide 16 couples to the cavity resonator 1 via a circular coupling iris 17 (see FIG. 7).

A coupling screw 18 extends into the waveguide 16 in close proximity to the coupling iris 17 and is provided for varying the coupling between the oscillator 15 and the cavity resonator 1, as desired. In addition a phase control screw 19 is provided extending into the short length of waveguide 16 for adjustably changing the electrical length of the transmission line between the oscillator and the cavity, as desired, for maximum stabilization.

As a result of having a length of transmission line between the reflex klystron oscillator 15 and the cavity resonator 1 two transmission line resonant modes are introduced, one on the low and one on the high frequency side of the desired resonant frequency of the cavity resonator. These unwanted modes occur at a frequency such that the susceptance of the cavity is equal and opposite to the susceptance of the electrically lengthened or shortened transmission line loaded at the end by the off resonance impedance of the cavity. A thin card of lossy material 20 as of, for example, mica coated with a platinum film is placed within the section of waveguide 16 such that the thin edge is presented to the direction of propagation of the wave energy and the plane of the card lies in the region of maximum electric field of the undesired modes, approximately one quarter wavelength from the coupling iris 17 whereby the undesired resonant modes of the transmission line are heavily attenuated and thereby effectively suppressed. In the absence of suppression of these waveguide modes the cavity resonator is not a dependably self-starting device.

A circular output iris 21 is provided in the end plate 6 for coupling wave energy out of the cavity resonator 1 via a short section of rectangular waveguide 22 to a load 23. A coupling screw 24 is provided extending into close proximity to the output coupling iris 21 for controlling the wave energy coupling to the load 23, as desired.

Although the coupling irises 17 and 21 have been described and depicted as circular irises, they need not be of circular shape and could be replaced by other and different suitable coupling means such as, for example, coupling loops which are well-known in the art.

Two mode suppressors 26 are provided in the center of the cavity end walls 5 and 6 for suppressing certain undesired modes of oscillation. The mode suppressors 26 will be more fully described later in the specification.

In operation, the output signal from oscillator 15 is fed via waveguide 16 and the coupling iris 17 to the cavity resonator 1. The cavity resonator, due to its close electromagnetic coupling to the oscillator 15, serves to stabilize the frequency of the oscillator at the frequency of the excited and coupled to resonant mode of the cavity resonator 1. A portion of the stabilized R.F. signal is coupled from the cavity resonator 1 through the output coupling iris 21 via the output waveguide 22 to the load 23. A stabilizing cavity resonator built according to the teachings of the present specification has provided an effective Q of approximately 120,000 and a stability factor of between 100 and 200 over the frequency range of between 8 to 10 kilomegacycles.

The degree of stabilization produced by a given cavity resonator varies directly as the Q of the resonator. Therefore, to achieve high stability factors it is necessary that the cavity resonator have an extremely high Q. As was pointed out previously, if the cavity resonator can be made to operate exclusively on the $TE_{0,1,n}$ mode of the "smoke ring" mode family, the highest Q resonant mode would be provided. For the purposes of illustration one of the desired higher order "smoke ring" modes designated as the $TE_{0,1,5}$ is schematically depicted in FIG. 4 of the drawings and is characterized by a plurality of single transverse annular electric field configurations spaced apart in axial alignment.

To operate exclusively on the desired "smoke ring" mode all other interfering modes of oscillation within the frequency range of the cavity resonator must be effectively suppressed. It turns out that all modes of oscillation except the circular electric field modes (smoke ring modes) require at least some component of current to flow longitudinally in the side walls of the cavity resonator to support the electromagnetic fields thereof. Included in the modes requiring substantial longitudinal currents in the side walls are the transverse magnetic (TM) modes and many transverse electric (TE) modes.

The transverse magnetic (TM) modes are effectively suppressed, as in the copending application, by the provision of annular gaps 27 (FIGS. 1 and 7) at the junctions of the end walls and the side walls of the cylindrical cavity resonator cooperating with lossy material 28 (see FIG. 7) disposed in the side wall of the gap. It also turns out that many of the transverse electric modes of oscillation have at least some appreciable longitudinal current flowing in the side walls of the cavity resonator. Some of these modes are not effectively suppressed by the provision of the annular gaps at either end of the cavity resonator.

The present invention provides novel methods and apparatus for suppressing all of the unwanted low Q transverse electric modes of oscillation while not appreciably lowering the Q or suppressing the desired high Q "smoke ring" family of modes. The novel method includes the provision of alternately spaced relatively wide transverse conducting surfaces spaced apart by relatively thin transverse lossy elements disposed in longitudinal spaced apart relation and defining the cavity resonator side wall. This method has proven quite satisfactory for suppressing the large majority of unwanted modes without appreciably effecting the desired circular electric family of modes.

In a preferred embodiment of this method of mode suppression the cavity resonator is fabricated in a novel way (see FIGS. 1, 2a and 2b) which comprises the steps of boring the cavity housing 3 to an approximate diameter and depth and then coating the interior surfaces of the bored cavity housing with a layer of lossy adhesive material 29 (see FIGS. 2a and 2b) such as, for example, epoxy resin. Such an adhesive substance may comprise, for example: 10.5 parts by weight of Shell curing agent D to 100 parts by weight of Shell No. 828 epoxy resin to 500 parts by weight of carbonyl iron, grade E made by the General Aniline & Film Corp. The thickness of the adhesive substance 29 is approximately 50 thousandths of an inch.

While the lossy adhesive substance 29 remains fluid, an electrical conductor 31 as of, for example, copper is tightly wound in a helical configuration within the interior of the bore, the longitudinal axis of the spiral coinciding with the longitudinal axis of the bore. (See FIG. 2a). The helically wound conductor 31 may comprise, for example, standard enameled wire such as, for example, Formvar No. 16 wire made by the General Cable Co. Although a standard enameled wire was cited in the example, the conductor 31 need not be of circular cross section nor coated.

The free ends of the tightly wound conductor 31 are firmly held as by clamping to the cavity housing 3. The cavity housing 3 is then inserted into an oven and cured for 2 hours at a temperature of approximately 65° C. After curing the spirally wound conductor 31 is firmly embedded in the lossy epoxy resin which in turn is firmly bonded to the magnesium cavity housing 3. The clamps are then removed from the cavity housing 3 and the cavity housing 3 chucked in a lathe.

Successive cuts are then taken along the inside surface of the helical conductor 31. Each successive cut increasing the inside diameter of the helical winding. The inside diameter of the helical winding is increased until the helical conductor 31, if of a circular cross section, is cut down to the diameter of the wire. At this inside diameter of the helical winding, the conductor 31 will present a maximum of conductive surface to the side wall of the cavity resonator defined thereby and a minimum surface area of lossy material. The lossy surface area is defined by the very thin layer of lossy adhesive 29 disposed between adjacent turns of the helically wound conductor 31. When No. 16 gage enameled wire is used for the helical conductor 31 the thickness of the alternately spaced conductors at the surface of the cavity resonator are approximately 50 thousandths of an inch in width separated by 4 thousandths of an inch of enamel and approximately 1 thousandth of an inch of lossy material (see FIG. 2b).

A cavity resonator having its side walls constructed of a tightly wound helical conducting material separated at adjacent turns by a thin layer of lossy material, as shown in FIGS. 1 and 2b, will satisfactorily suppress practically all unwanted modes of oscillation which are characterized by longitudinal currents in the cavity side walls. In addition, the helical conducting surface has an almost negligible loading effect upon the desired circular electric family of modes.

One undesired family of modes, the $TE_{1,3,n}$ family, is not sufficiently suppressed by the helical conductor technique. The reason for this is that the longitudinal components of current flowing in the side walls of the resonator necessary to support the fields of this mode are very small. Fortunately, however, this $TE_{1,3,n}$ mode has heavy current concentration in the center of the end plates where the current concentration of the desired $TE_{0,1,n}$ mode of the "smoke ring" family of modes approaches zero. These relative current concentrations can readily be seen by reference to FIGS. 5 and 6 wherein the current concentrations for the $TE_{0,1,n}$ family and the $TE_{1,3,n}$ family of modes are shown respectively.

The novel mode suppressor 26, previously mentioned, is positioned at the center point of the cavity end walls 5 and 6 where the currents of the undesired $TE_{1,3,n}$ modes are a maximum and they serve to suppress the unwanted $TE_{1,3,n}$ modes. Essentially, the mode suppressor 26 comprises a short section of cylindrical waveguide coupled to the cavity resonator 1 via a resonant iris and has its interior capacitively loaded with a lossy dielectric material for absorbing energy propagated therethrough, and for increasing the cut-off wavelength to a point which allows such propagation.

Referring now to FIGS. 7 through 10 the novel mode suppressor 26 will be described in greater detail. This mode suppressor 26 forms the subject of a co-pending divisional application, entitled, Mode Suppressor Apparatus, U.S. Serial Number 129,473, filed August 4, 1961. The end wall of the cavity resonator is centrally bored to receive a hollow cylindrical conductor 33 forming the cylindrical waveguide section. The receiving end of the waveguide is closed by a transverse conducting wall 34. The interior of the short section of cylindrical waveguide 33 is filled with a lossy material 35 such as, for example, epoxy resin having the following proportions: 10.5 parts by weight of Shell curing agent D to 100 parts by weight of Shell No. 828 epoxy resin to 200 parts by weight of carbonyl iron Grade E. Two spaced apart longitudinal bores 36 and 37 are provided in the epoxy resin to produce the desired characteristic impedance of the short length of transmission line.

A dumbbell type resonant iris 38 is provided closing off the other end of the short section of cylindrical waveguide and serves as a low Q resonant iris for coupling energy from the cavity resonator 1 to the short length of cylindrical waveguide. A relatively short space 39 is provided between the resonant iris 38 and the lossy dielectric loading substance 35 of the waveguide for providing an impedance match between the resonant coupling iris 38 and the loaded waveguide.

Two such mode suppressors 26 are provided for suppressing the $TE_{1,3,n}$ family of modes, one in the center of each end conducting wall of the cavity resonator. The two mode suppressors 26 disposed at either end of the cylindrical cavity resonator 1 have the longitudinal axes of their dumbbell irises disposed substantially 90° with respect to each other as shown in FIG. 10. The reason for this 90° relative orientation can readily be seen by reference to FIG. 6 wherein the current distribution and direction for the $TE_{1,3,n}$ mode are shown as they would appear in the end walls of the cylindrical cavity resonator. Notice that in the center of the end wall in the vicinity of the mode suppressor 26 the currents assume a rectilinear motion and have a certain direction depending upon the particular orientation of the $TE_{1,3,n}$ mode. The wave energy coupling between the mode suppressor 26 and energy of the $TE_{1,3,n}$ mode is a maximum when the currents of the $TE_{1,3,n}$ mode in the vicinity of the mode suppressor are substantially at right angles to the longitudinal axis of the dumbbell iris 38. The coupling between the currents of the $TE_{1,3,n}$ mode and the mode suppressor 26 follow approximately a sine relationship as a function of the angle between the longitudinal axis of the dumbbell iris 38 and the direction of the currents. Since the $TE_{1,3,n}$ mode may assume any one of an infinite number of orientations within the cavity resonator 1 disposing the axes of the mode suppressors 26 at right angles to each other assures close coupling to the $TE_{1,3,n}$ mode at all times and for all possible mode orientations.

The entire circular electric family of modes ($TE_{0,n,m}$), containing both the wanted and unwanted sub-families of modes, will be supported by the otherwise mode suppressed cavity resonator thus far described. Referring now to FIG. 3 there is shown a circular electric mode chart describing the excitable modes in a certain cylindrical cavity resonator exemplary of a resonator as previously described. The heavy vertical line on the mode chart indicates the maximum extent of plunger travel. The left hand ordinate defines the other extent of plunger travel. It can be seen that the undesired $TE_{0,2,n}$ mode interferes with the desired $TE_{0,1,n}$ mode within the tuning range of the cavity resonator.

Referring now to FIG. 11 there is shown in diagrammatic form the field configuration for the interfering and unwanted $TE_{0,2,n}$ mode as it appears near the end wall of the cavity resonator. It can be seen that the unwanted $TE_{0,2,n}$ mode has an electric field configuration characterized by two circular electric field rings concentrically disposed. The electric field vectors in the inner and outer concentric rings are found to be in opposite directions.

Referring now to FIG. 12 there is shown diagrammatically the current distribution in the cavity end wall for the unwanted and interfering $TE_{0,2,n}$ mode. It can be seen from this diagram that at a certain radius from the center of the cavity end wall there is a minimum current density for circulating currents of the $TE_{0,2,n}$ mode. In FIG. 5 there is shown a similar diagram for the current densities of the circulating currents for the desired $TE_{0,1,n}$ mode. Comparing these two diagrams it can be seen that the $TE_{0,1,n}$ mode has a maximum current density near a radius where the current density of the $TE_{0,2,n}$ mode is a minimum. By locating the input and output coupling irises 17 and 21 respectively at this certain radius from the center of the cavity end wall, the irises will couple strongly to the desired $TE_{0,1,n}$ mode and provide negligible coupling to the unwanted $TE_{0,2,n}$ mode. This being the case the $TE_{0,2,n}$ mode is not excited and for practical purposes acts as though it were suppressed.

Referring now to the circular electric mode chart FIG. 3 and considering the $TE_{0,2,n}$ mode to be suppressed, it can be seen that the desired pure $TE_{0,1,n}$ modal operation is achieved over a wide range of frequencies. In a certain exemplary cavity resonator which has been built to operate at X-band frequency this range of pure $TE_{0,1,n}$ modal operation exceeds 2,000 megacycles.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. Mode suppression apparatus for suppressing the $TE_{1,3,n}$ family of modes including, a cylindrical cavity resonator, a low Q resonant iris coupling means for coupling wave energy out of the cavity resonator, said coupling means disposed in the center of the end wall of the cavity resonator, waveguide means disposed outwardly of said cavity resonator and coupled thereto via said iris coupling means, attenuating means disposed within said waveguide means whereby wave energy of the $TE_{1,3,n}$ mode family which is coupled through said coupling means into said waveguide means is attenuated and thereby serves to prevent the $TE_{1,3,n}$ mode from being sustained within the cavity resonator.

2. A high Q cylindrical cavity resonator apparatus adapted for operation substantially on the higher order $TE_{0,1,n}$ family of modes comprising means for suppressing electromagnetic modes having substantial longitudinal currents flowing in the cylindrical cavity side walls, a lossy waveguide coupled to the cavity and centrally disposed of the end walls thereof for suppressing the $TE_{1,3,n}$ family of modes characterized by substantial currents flowing in the center of the circular end conducting walls, a low Q resonant iris disposed substantially at the center of the circular end conducting wall and serving to couple said lossy waveguide to the cavity resonator, and means for coupling wave energy into the cavity resonator for selectively coupling to electromagnetic energy of the $TE_{0,1,n}$ mode without exciting the $TE_{0,2,n}$ family of modes.

3. In an apparatus as claimed in claim 2 wherein said coupling means for selectively coupling to electromagnetic energy of the $TE_{0,1,n}$ mode comprises coupling iris means disposed in the circular end conducting wall of the cavity resonator at a radius from the center of the wall wherein the current produced by the $TE_{0,1,n}$ mode is a maximum and the current of the $TE_{0,2,n}$ family is a minimum.

4. In a high Q tunable cavity resonator apparatus, a hollow tubular body having end closing walls closing the ends of said tubular body and the interior walls of said hollow body forming a cavity resonator, means for exciting substantially only the $TE_{0,1,n}$ modes of the circular electric family within said cavity resonator whereby an extremely high Q cavity resonance may be obtained, said cavity resonator including side wall portions having closely spaced transversely directed conductor portions, and lossy material disposed in between said closely spaced conductor portions for suppressing field configurations within the cavity resonator requiring substantial longitudinal currents in the side walls thereof.

5. Apparatus according to claim 4 wherein said transversely directed conductor portions comprise adjacent turns of a tightly wound helical conductor the inside surface of said tightly wound helical conductor forming said side wall portions of said cavity resonator.

6. The apparatus according to claim 5 wherein said lossy material and said helical conductor present a smooth and integral surface to the interior of said cavity resonator.

7. The apparatus according to claim 5 wherein the thickness of said lossy material disposed in between adjacent turns of said conductor is less than the thickness of said adjacent turns of said conductor.

8. The apparatus according to claim 4 including wave energy attenuator means coupled to the fields of said cavity resonator substantially through the mid point of at least one of said cavity end closing walls for suppressing the $TE_{1,3,n}$ family of modes by heavily coupling to and preventing sustained oscillation of said $TE_{1,3,n}$ modes.

References Cited in the file of this patent

UNITED STATES PATENTS

| | | |
|---|---|---|
| 2,593,095 | Brehm | Apr. 15, 1952 |
| 2,639,327 | Heller | May 19, 1953 |
| 2,701,343 | Lange | Feb. 1, 1955 |
| 2,710,945 | Edson | June 14, 1955 |
| 2,746,130 | Davis | May 22, 1956 |
| 2,763,052 | Elmer | Sept. 18, 1956 |
| 2,848,696 | Miller | Aug. 19, 1958 |

FOREIGN PATENTS

| | | |
|---|---|---|
| 603,119 | Great Britain | June 9, 1949 |